United States Patent Office 3,098,011
Patented July 16, 1963

3,098,011
PROCESS OF PRODUCING A VACCINE AGAINST DISTEMPER
Gunnar Rockborn, Stockholm, Sweden, assignor to Behringwerke Aktiengesellschaft, Marburg (Lahn), Germany, a corporation of Germany
No Drawing. Filed Aug. 30, 1960, Ser. No. 52,781
Claims priority, application Great Britain Sept. 3, 1959
4 Claims. (Cl. 167—78)

The present invention relates to a process of preparing a vaccine against distemper, containing a living attenuated apathogenic distemper virus which upon injection in animals of the family of Canidae and Mustelidae produces immunizing antibodies which are identical with the antibodies formed by virulent viruses producing distemper.

The method now generally used for producing an attenuated living vaccine is based upon the cultivation of the distemper virus in embryonated hen's eggs, for example as described in U.S. Patents Nos. 2,136,131, 2,271,819 and 2,391,540. However, a vaccine produced in such a manner is usually of a relatively low titer, in the range of about $10^3$ to $10^4$/milliliter. Furthermore, the process is complicated, time-consuming and expensive.

Now I have found that a vaccine against distemper can be produced in such a way that the distemper virus is cultivated in at least 50 successive passages in a culture tissue while using a buffered nutrient fluid at a pH-value between 7.0 and 8.0, that the nutrient fluid thus obtained and containing the modified virus is collected and, if necessary, lyophilized.

As culture tissue for the distemper virus there are appropriate, for instance, kidneys of Canidae and Mustelidae, especially kidneys of 6 to 8 weeks old dog whelps. Furthermore, spleen, testicle and uterus tissue can be used.

As nutrient or culture fluid there enter into consideration preferably Hank's solution containing 0.5% of lactalbumin hydrolysate with about 10% of horse serum or 20% of calf serum or Earle's solution containing about 2% of horse serum and 0.5% of lactalbumin hydrolysate containing per milliliter about 100 units of penicillin and 50 mcg. of streptomycin and showing a pH-value between 7.0 and 8.0, preferably of 7.6. It is suitable to adjust the optimal pH-value by means of sodium bicarbonate. The distemper virus is advantageously cultivated at a temperature between 30 and 37° C., preferably at 35 to 37° C.

The present invention is an improved method of preparing a distemper vaccine which is easy to perform under readily controllable conditions. The process according to the invention is based on the discovery that the cultivation of the distemper virus in a tissue culture produces characteristic changes of the tissue which are easily detectable by a simple inspection under a microscope.

During cultivation the virus is released into the culture fluid. The culture fluid containing the virus is then transferred to new tissue cultures and the cultivation is repeated. These passages are repeated a sufficient number of times until the virus becomes attenuated. A few passages of the virus do not give satisfactory results as to the desired apathogenicity and it was therefore thought, that it would not be possible to produce an active vaccine having the necessary apathogenicity and the required high antigenicity. However, it has now surprisingly been found that by a large number of passages, viz. about fifty passages or more, it is possible to produce a virus which is even apthogenic to ferrets known to be extremely sensitive towards distemper, and still has its antigenic ability substantially unchanged. It has furthermore surprisingly been found that the titer of the virus has increased after about 50–60 passages in comparison with the titer of the original virus.

According to a preferred embodiment of the invention the process may be carried out as follows:

A. The kidneys from young dogs are removed under aseptic conditions under deep anesthesia. Upon removing the kidney capsule the kidney cortex is cut into small pieces which after repeated washing in buffered aqueous phosphate solution are treated with a buffered 0.25% trypsin solution and warmed to about 37° C. for 10 minutes with stirring. The stirring is then interrupted and the pieces are allowed to sediment. The supernatant trypsin solution is removed and discarded. Fresh 0.25% trypsin solution is added and the trypsinization is continued for another 20 minutes at about 37° C. The cell suspension thus obtained is filtered to remove some larger fragments and is then centrifugated at about 1000 revolutions per minute for 5 minutes in a refrigerator. The centrifugate is discarded. The thus obtained cell sediment is suspended in a nutrient medium which consists of Hank's solution with 0.5% of lactalbumin hydrolysate, 10% of horse serum (or 20% of calf serum), 100 units of penicillin and 50 mcg. of streptomycin per milliliter. The cell concentration in the medium is adjusted to about 200,000 cells per milliliter. The suspension is distributed into test tubes in a quantity of about 1 milliliter per test tube. The test tubes are placed in an almost horizontal position during the growth of the cells. Upon development of a sheet of cells at about 35–37° C. in the tubes the culture solution is changed into a nutrient medium containing only 2% of horse serum and Earle's solution instead of Hank's solution. The tissue culture is then inoculated with canine distemper virus material which originally has been isolated from the blood of acute distemper diseased dogs. The culture fluid is harvested after 3–4 days by collecting the culture fluid which contains the virus. The remaining cells may be used for repeated cultivations by addition of fresh nutrient medium and can thus be utilized for about four new harvests of virus containing culture fluid.

The culture fluid thus obtained is used to inoculate a fresh tissue culture and the cultivation is repeated as before.

After about fifty passages in this manner the culture fluid obtained which contains the attenuated apathogenic virus may be directly used as the vaccine. The activity of the vaccine is tested on a tissue culture of the above-mentioned kind by determining the cytopathogenic effect. The culture fluid is preferably lyophilized immediately upon the last passage and may be stored in this manner until used for vaccination.

B. For producing larger amounts of distemper vaccine the following method has proved advantageous:

For the cultivation of distemper virus in the tissue culture, healthy 6 to 8 weeks old dog whelps are used which in order to test their state of health, are isolated under control for about 10 days. For preparing tissue cultures the whelps are sacrificed and the kidneys are freshly removed under sterile conditions. In a sterile chamber the kidney capsules are removed, the portions of connective tissue of the kidney pelvis are removed and the kidney cortex is cut into small pieces that are collected in a vessel and washed with distilled water containing 10% of phosphate buffer. The kidney pieces are then filled into a so-called trypsinization vessel. Under sterile conditions a trypsin solution of 0.25% strength warmed to about 37° C. is introduced. The trypsinization is carried out by permanently stirring with a magnetic stirrer, i.e. by action of this enzyme individual kidney cells are separated from the small pieces of tissue. The kidney cells suspended in the solution are drawn off and collected in a vessel. In order to stop the trypsinization process the collecting vessel is placed into an ice-water bath. The period of action of the trypsin amounts to about 20–25 minutes. The trypsin is then removed by centrifugation. For this purpose the suspension of kidney cells is filled into centrifuge cups and centrifuged for about 5 minutes at about 1000 r.p.m. The centrifugation product is suspended with distilled water buffered by means of phosphate and again centrifuged at 600 r.p.m., whereby blood corpuscles likewise remain in excess and may be removed. The cell sediment thus obtained is suspended in a nutrient solution in the ratio of 1:300 to 1:400. The nutrient solution used for the suspension advantageously consists of Hank's solution with 0.5% of lactalbumin hydrolysate, 20% of calf serum, 100 units of penicillin and 50 mcg. of streptomycin per milliliter as well as of 0.01% of phenol red. In a sterile system the cell suspension is passed over gauze and filled into culture vessels such as rolled edge tubes, square bottles, Fernbach flasks or, preferably, so-called penicillin flasks. The culture vessels are incubated at a temperature of about 35–37° C., whereupon the kidney cells deposit at the glass walls and are multiplied due to cell-division. After about 4–5 days the nutrient fluid has to be replaced. This is done by decanting the exhausted nutrient solution or by drawing it off by means of a lifter. For feeding the culture, Hank's solution with 0.5% of lactalbumin hydrolysate as described above is used, but containing only 10% of calf serum.

Generally, the culture layer is completely washed out after a further 2 to 3 days so that the inoculation with the distemper virus may be effected. Instead of Hank's solution Earle's solution containing 0.5% of lactalbumin hydrolysate, 2% of horse serum and the above-mentioned additions of antibiotics and phenol red is preferably used for the inoculation.

An apathogenic distemper virus suspension (for instance virus of the 56th tissue passage in a ratio of 1:20 to 1:200) is now introduced into the culture vessels. The culture flasks are again incubated at about 35–37° C. They are subjected to daily microscopical examinations as to changes typifying the increase of the distemper virus. Such characteristic changes are an intensified granulation of the cells, aggregation of the cell nuclei with dissolution of the cell walls to form so-called giant cells which generally exhibit a granulated center and a plasma border with vacuole at the periphery. At this moment the cells permanently deliver virus to the adjacent nutrient medium. This nutrient solution containing virus is harvested by decantation or siphoning. After the harvest the culture tissue is suitably fed with fresh nutrient medium (Earle's solution as described above). Since the cells infested with the distemper virus keep their viability, distemper virus is permanently produced so that within a certain interval repeated harvest or feeding can be effected. It is thereby possible, for example, to obtain 4 harvests from 1 culture. The harvested virus suspension is preserved at a temperature of −35 to −70° C. and can thus be kept in stock for the vaccine production. From the individual harvests samples are taken which are examined as to sterility and titered as to their virus content in the tissue culture. The virus suspension that has been found suitable is thawed up and by small amounts filled into small bottles, deep-frozen and lyophilized.

The product thus obtained contains leaving apathogenic distemper viruses in dried form which are, therefore, stable over long periods. After re-dissolution in a solvent such as buffered distilled water, it is excellently suitable for immunization of Canidae and Mustelidae against distemper.

The production of a living apathogenic distemper virus from the tissue culture in contradistinction to that hitherto cultivated and multiplied in embryonated hen's tissue shows considerable advantages. For instance, by cultivation of the kidneys of an 8 weeks old dog there are obtained as many vaccination doses as are obtained from 3000 hen's eggs. Another considerable advantage consists in obtaining a virus titer increased by at least two-tenths powers/milliliter so that due to the repeated harvest and the higher virus content a considerably increased yield and, therewith, reduced production costs are attained in comparison with the vaccine against distemper virus obtained from eggs.

The examination of the activity of the vaccines obtained according to the invention is exemplified as follows; the examples serve to illustrate the invention but they are not intended to limit it thereto.

EXAMPLE 1

Each of 4 ferrets was given intraperitoneally 1 milliliter of the tissue culture fluid containing virus produced according to the process described under A, the titer of which amounted to $10^{5.5}$ $TCID_{50}$. The designation $TCID_{50}$ refers to the "tissue culture infectivity doses" defined according to the method of Reed and Muench, Am. J. Hyg. 27, 493 (1938). In the same laboratory there were kept 3 non-immune ferrets as control animals and a further 2 were placed in an adjacent room in order to control a direct transfer of the apathogenic distemper virus by the vaccinated animals which could have occurred. Within an observation period of 25 days none of the animals showed any symptoms of disease. Prior to the experiment and on the 17th day after the infection blood samples were taken from all animals. With the sera inactivated for 30 mintues at 56° C. there were carried out, after a stay of 1 hour at room temperature, neutralization tests of tissue cultures against 300 $TCID_{50}$ of dog's distemper virus. On the 17th day, the 50% neutralizing titer of the vaccinated animals amounted to more than $10^{-2}$ (final dilution of the serum). Neutralizing antibodies were not found in the sera obtained prior to the vaccination nor in the sera of the control animals at the 17th day.

On the 25th day all animals from now kept in the same room were infected with Green's distemperoid virus (75 milligrams of lyophilized spleen of ferrets). After a uniform incubation period of 7 days all control animals showed typical clinical symptoms of distemper and died by the 11th day after the infection or were sacrificed, because of showing distinct symptoms of distemper. During an observation period of three weeks the 4 animals vaccinated with tissue culture virus did not show any symptoms.

EXAMPLE 2

The modified apathogenic distemper virus produced according to the method described under A was likewise tested in dogs as to tolerability, harmlessness and efficiency.

8 three months old whelps (hybrids) not immune against the distemper virus were placed into an isolated enclosure. Five of these dogs were vaccinated each intramuscularly with 1 milliliter of the above-mentioned tissue suspension containing distemper virus (ferrets test). The other three dogs were kept as untreated control animals. After having obtained the virus material for the immunization of the dogs, it was lyophilized and stored for 5 months at −70° C. The redissolved vaccination substance used for the vaccination showed in 1 ml. a virus content of $10^{5.5}$ $TCID_{50}$. A reduction of the virus content had not occurred during the storage period of 5 months.

On the 4th day after vaccination three of the vaccinated dogs showed a moderately raised temperature and a slight temporary conjunctivitis. For the rest, all dogs remained healthy during an observation period of 44 days.

Prior to the beginning of the tests and on the 10th and 20th day after vaccination samples of serum were taken from all dogs, from the control dogs likewise on the 38th day. These samples were examined as to antibodies against distemper in order to find out whether by the common stabling of vaccinated and non-vaccinated animals a transfer of the vaccination virus onto the control animals took place. It was found that in the serum of the control animals likewise on the 38th day there existed no antibodies. Neutralizing antibodies with a significant titer were found already after 10 days in the sera of vaccinated dogs. The study of the antibodies was carried out in dogs' kidney epithelium cultures in the same manner as effected in the immunization tests on ferrets. In all vaccinated dogs the serum in a dilution of 1:100 was sufficient to neutralize 300 $TCID_{50}$ of the distemper virus. Higher serum dilutions were not tested.

On the 44th day after vaccination all whelps were intramuscularly infected with a Snyder-Hill strain pathogenic to dogs. This strain is said to cause in dogs 100% encephalitis when intracerebrally inoculated; with other inoculation methods it causes in 25% of the cases distemper from which encephalitis develops. In the present case the 5 animals previously vaccinated with the culture virus remained uninfluenced, whereas all control animals after 3–4 days fell ill from typical distemper, with high fever and extended symptoms. One of the control animals died after 12 days after having shown serious nervous symptoms, lockjaw, contractions of the eye and ear muscles. On autopsy, encephalitic changes in the cerebellum and eosinophilic cytoplasmatic inclusions were found in the epithelial cells of the tracheal mucous membrane. One of the two other control animals showed nervous muscle contractions in the body and the extremities, ataxic movements and high-grade apathy. The observation period after inoculation with the Synder-Hill strain amounted to 52 days. The results are to be seen from Table 1.

Another test in order to examine the properties of the distemper virus modified in the tissue culture was carried out on 6 eight weeks old predisposed dog whelps. Two animals of the same litter each were placed together in isolated stables and one of them each was intramuscularly vaccinated with 0.5 milliliter of a distemper virus suspension. For the vaccination there was again used a lyophilized distemper virus of the 65th passage of the vaccination virus as used in the preceding tests. On the 4th day after vaccination one of three dogs showed a short temperature rise to 39.8° C. without any other clinical symptoms. Blood samples were taken from all dogs the 10th, 20th, 30th and 40th day after vaccination and the serum was tested in the virus neutralization test in embryonated hens' eggs as to antibodies neutralizing distemper viruses (G. A. Baker, H. R. Gorham, R. W. Leader: Am. J. Vet. Res. 15, 102 (1954)). While the vaccinated dogs developed a very high level of serum antibodies against distemper, the untreated control dogs did not develop serum antibodies during the observation period of 40 days, as can be seen from Table 2.

These experiments show that virulent distemper viruses after about 50 passages in the tissue culture, while maintaining the antigenic capacity, are apathogenic to such a degree that by inoculation with the vaccine according to the invention a satisfactory serum immunity in Canidae and Mustelidae as well as an infection immunity against highly pathogenic virus strains is attained, none of the vaccinated animals falling ill. A transfer of the vaccination virus from the vaccinated animals to the control animals does not occur, even when the latter are in narrow contact with the vaccinated animals during the whole test period.

*Table 1*

| State | Dog No. | Serum antibodies prior to vaccination | $TCND_{50}$[a] of the serum antibodies against distemper after vaccination | | Test infection with active distemper virus |
|---|---|---|---|---|---|
| | | | On the 10th day | On the 20th day | |
| Vaccinated | 1 | None | Higher than $10^{-2.0}$ | $10^{-3.5}$ | Remained healthy. |
| Do | 2 | do | do | $10^{-3.4}$ | Do. |
| Do | 3 | do | do | $10^{-3.5}$ | Do. |
| Do | 4 | do | do | $10^{-3.2}$ | Do. |
| Do | 5 | do | do | Higher than $10^{-2.0}$ | Do. |
| Control | 6 | do | None | None | Distemper diseased. |
| Do | 7 | do | do | do | Do. |
| Do | 8 | do | do | do | Do. |

[a] $TCND_{50}$=neutralizing serum dilution of 50% strength.

*Table 2*

| State | Dog No. | Serum antibodies before vaccination | Vaccination dose intramuscularly administered, milliliter | Clinical course after vaccination | | Proof of serum antibodies neutralizing distemper virus, tested in hen's egg on the | | | |
|---|---|---|---|---|---|---|---|---|---|
| | | | | Fever | Other symptoms | 10th day p. v.[1] | 20th day p. v.[1] | 30th day p. v.[1] | 40th day p. v.[1] |
| Vaccinated | 9955 | None | 0.5 | No | None | 84,495 | >210,195 | >210 195 | >836,417 |
| Do | 9958 | do | 0.5 | No | do | 353,700 | >210,195 | >210,195 | >836,417 |
| Do | 9960 | do | 0.5 | (2) | do | 44,540 | 23,355 | >210,195 | >836,417 |
| Control | 9956 | do | | No | do | none | none | none | none |
| Do | 9959 | do | | No | do | none | none | none | none |
| Do | 9961 | do | | No | do | none | none | none | none |

[1] P.v.=after vaccination.

[2] On the 4th day after the vaccination temperature of 39.8° C., in the rest of the observation period normal temperature.

I claim:

1. A process of producing a canine distemper vaccine which comprises cultivating pathogenic canine distemper virus which is naturally adapted to propagate in canine tissue culture by serially passing said virus through a total of at least fifty canine kidney tissue cultures, at a pH value between 7.0 and 8.0, and harvesting the thus obtained nutrient fluid containing the modified virus.

2. A process as claimed in claim 1 wherein, after harvesting the nutrient fluid containing the modified virus, fresh nutrient solution is added to the culture tissue, the nutrient fluid containing the modified virus is harvested again and this measure is repeated twice.

3. A process as claimed in claim 1, wherein the harvested nutrient fluid containing the modified virus is lyophilized.

4. A canine distemper vaccine prepared by the method defined in claim 1.

References Cited in the file of this patent

Rockburn: Archiv. Virus Forschung, 1958, vol. 8, pages 485–492.

Cabasso et al.: Proc. Soc. Exp. Biol. Med., March 1959, pages 551–554.

Vantsis: Vet. Rec. 71 (1959), 99–100, cited in J. Amer. Vet. Med. Assoc., January 1, 1960, pages 5 and 7.